US008417599B2

(12) United States Patent
Wirth, Jr.

(10) Patent No.: US 8,417,599 B2
(45) Date of Patent: Apr. 9, 2013

(54) METHOD AND SYSTEM FOR BROWSING AND ORDERING FROM CATALOGS VIA THE INTERNET

(76) Inventor: John Wirth, Jr., Dubois, WY (US)

( * ) Notice: Subject to any disclaimer, the term of this patent is extended or adjusted under 35 U.S.C. 154(b) by 2314 days.

(21) Appl. No.: 10/004,107

(22) Filed: Dec. 6, 2001

(65) Prior Publication Data

US 2003/0110098 A1 Jun. 12, 2003

(51) Int. Cl.
*G06Q 40/00* (2012.01)
(52) U.S. Cl. .......................................... 705/35; 386/225
(58) Field of Classification Search .................. 705/26, 705/27, 35; 386/225
See application file for complete search history.

(56) References Cited

U.S. PATENT DOCUMENTS

| | | | | |
|---|---|---|---|---|
| 5,440,401 | A | * | 8/1995 | Parulski et al. ............... 386/124 |
| 5,721,832 | A | * | 2/1998 | Westrope et al. ............... 705/27 |
| 5,799,157 | A | * | 8/1998 | Escallon ........................ 705/27 |
| 5,913,210 | A | | 6/1999 | Call |
| 5,960,411 | A | | 9/1999 | Hartman et al. |
| 6,397,143 | B1 | | 5/2002 | Peschke |
| 6,553,367 | B2 | | 4/2003 | Horovitz et al. |
| 6,557,006 | B1 | | 4/2003 | Headrick et al. |
| 6,708,309 | B1 | | 3/2004 | Blumberg |
| 2002/0055891 | A1 | | 5/2002 | Yang |
| 2002/0099591 | A1 | | 7/2002 | Dyer |
| 2002/0111879 | A1 | | 8/2002 | Melero et al. |
| 2002/0141641 | A1 | | 10/2002 | Zhu |
| 2002/0156688 | A1 | | 10/2002 | Horn et al. |
| 2002/0156695 | A1 | | 10/2002 | Edwards |
| 2004/0006509 | A1 | | 1/2004 | Mannik et al. |

OTHER PUBLICATIONS www.bartswatersports.com; date available Oct. 1, 2000, as provided by www.archive.com.*
Gralla, Preston, "How the Internet Works", Aug. 1999, Macmillan Computer Publishing, Millennium Edition, p. 127.*
"Microsoft Computer Dictionary", 1999, Microsoft Press, Fourth Edition, pp. 230 and 442.*
www.lillianvernon.com, posted on the web on Oct. 25, 2001, found using www.archive.com's Wayback Machine.*
www.harolds.com archived 1998, found on www.archive.com.*
www.harolds.com, archived in 1998, same pages from the previous Office Action, used to show image maps.*
www.imagecure.com/imgsplit.html archived Oct. 27, 2001, Image Splitter product available to the public Oct. 2001.*
Website www.catalogcity.com—"Japan Woodworker Catalog of Fine Woodworking Tools" (Fall/Winter 1999—vol. 28, Nov. 30, 1999.
Jul. 16, 2005 Declaration of John Wirth with 10 attachments.

(Continued)

*Primary Examiner* — Daniel Felten
(74) *Attorney, Agent, or Firm* — Nixon & Vanderhye P.C.

(57) ABSTRACT

A method and system for browsing and ordering from product catalogs via the Internet is disclosed. When a customer requests a catalog page, a low resolution image of the requested page is first provided to the customer. The size of the computer file corresponding to the page is reduced to be as small as possible, while still allowing products imaged on the page to be recognized. When a customer clicks on a hyperlink in the form of a blocked area in the low resolution image catalog page corresponding to a particular product, a more detailed presentation for that product is built from stored files which include a high resolution picture of the product, a headline file identifying the product, a copy file describing the product, and an order block data file providing detailed information for ordering the product. By initially providing low resolution images for requested catalog pages, such pages can be quickly downloaded to a customer's computer.

6 Claims, 8 Drawing Sheets

OTHER PUBLICATIONS

Jakob Nielsen's Alertbox for Nov. 1996: "Marginalia of Web Design".
Introduction to Dreamweaver 2.0 (Mar. 25, 2000).
Tutorial Overview for Dreamweaver (Nov. 1998).
University of South Carolina Computer Services, IT Training & Support,"Introduction to Adobe Acrobat 5" (Feb. 20, 2001).
Bizfinity, Inc., 2001, "bizfinity PRO Web Store Creator".
Dieter Weidenbruck, ITEDO Software, May 17, 1999, Electronic Catalogs, "The Current State of Technology".
"Features" Cart 2000, Intelligent Business Solutions (1998).
Cart 200 Demo Store Main Page, Intelligent Business Solutions (1998).
Esteve, Caroline "An approach for e-doc using XML technology" (Jun. 2000).
LaGrade, "StoreFront" 5.0 (SE User Guide) (at least Nov. 2001).
PHP and My SQL Web Development index pages for chapters 23-27, (Mar. 2001).
ITEDO, ISO View—3.0 available now (Sep. 2001).

* cited by examiner

CATALOG COMPANY NAME

BROWSE PRINT CATALOG, BROWSE PRODUCTS BY CATEGORY
SEARCH PRODUCTS, CHECKOUT

New Products

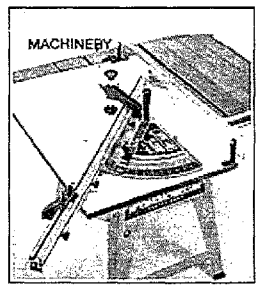

Choose one of the following, or
Browse our complete category listing

  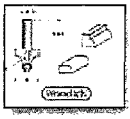

Machinery    Power Tools    Router Bits

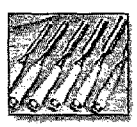  

Hand Tools    Abrasives    Hardware

 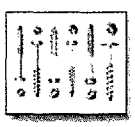 

Saw Blades    Fasteners    Clamps and Vises

Specials and Closeout Specials

Specials

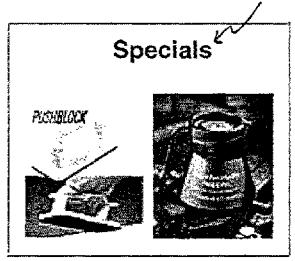

  

Wood Specialties    Drill and Boring Bits    Finishes and Supplies

Fig. 3

CATALOG COMPANY NAME

BROWSE PRINT CATALOG, BROWSE PRODUCTS BY CATEGORY
SEARCH PRODUCTS, CHECKOUT

42A

43A

SCREW TIP AUGER BIT SET FOR STRAIGHT, DEEP HOLES IN TOUGH MATERIALS

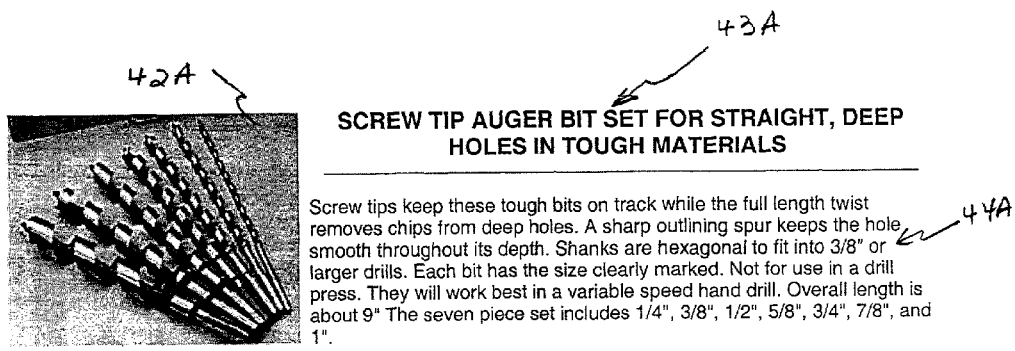

Click for Larger Image

Screw tips keep these tough bits on track while the full length twist removes chips from deep holes. A sharp outlining spur keeps the hole smooth throughout its depth. Shanks are hexagonal to fit into 3/8" or larger drills. Each bit has the size clearly marked. Not for use in a drill press. They will work best in a variable speed hand drill. Overall length is about 9" The seven piece set includes 1/4", 3/8", 1/2", 5/8", 3/4", 7/8", and 1".

44A

45A

| | | | Qty | |
|---|---|---|---|---|
| 930-281 | 7pc Deluxe Auger Bit Set | Each | $54.95 | |

QUICK-CHANGE DRILL BITS

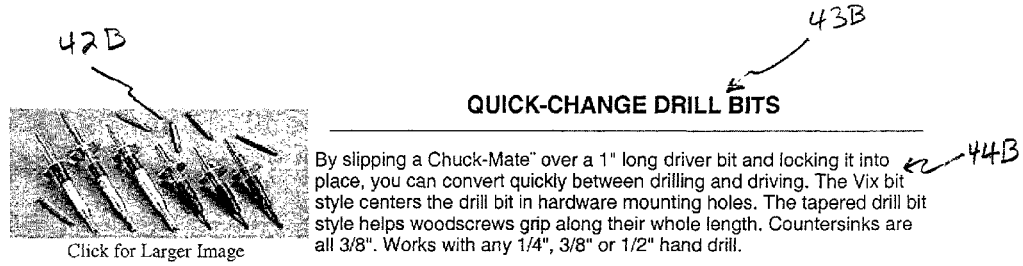

Click for Larger Image

By slipping a Chuck-Mate™ over a 1" long driver bit and locking it into place, you can convert quickly between drilling and driving. The Vix bit style centers the drill bit in hardware mounting holes. The tapered drill bit style helps woodscrews grip along their whole length. Countersinks are all 3/8". Works with any 1/4", 3/8" or 1/2" hand drill.

44B

45B

| | | | Qty | |
|---|---|---|---|---|
| 825-028 | V3 Vix Bit 5/64" | Per Unit | $15.95 | |
| 825-035 | Chuck-mate 7/64" Vix Bit | Per Unit | $15.95 | |
| 825-042 | Chuck-mate 9/64" Vix Bit | Per Unit | $15.95 | |

CATALOG COMPANY NAME
BROWSE PRINT CATALOG, BROWSE PRODUCTS BY CATEGORY
SEARCH PRODUCTS, CHECKOUT
Special Products
Fig. 8

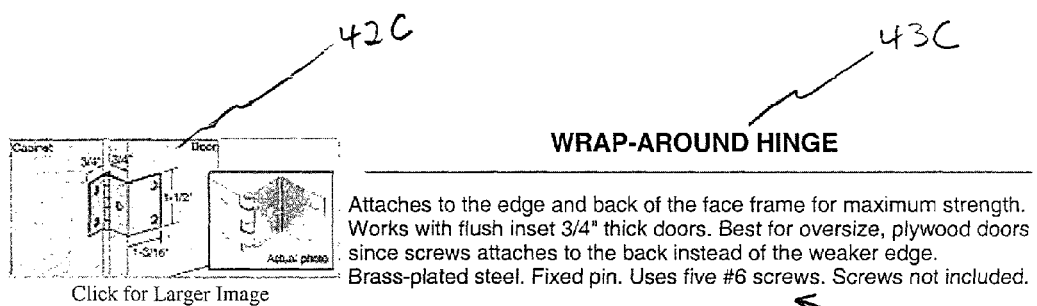

42C

43C

WRAP-AROUND HINGE

Attaches to the edge and back of the face frame for maximum strength. Works with flush inset 3/4" thick doors. Best for oversize, plywood doors since screws attaches to the back instead of the weaker edge.
Brass-plated steel. Fixed pin. Uses five #6 screws. Screws not included.

Click for Larger Image

44C

| | | | | Qty | |
|---|---|---|---|---|---|
| 804-465 | Pr Ant Brass Wrap Around Hinge | Pair | $3.95 |  | |
| 804-472 | Pr Pol Brass Wrap Around Hinge | Pair | $3.95 | | |

METHOD AND SYSTEM FOR BROWSING AND ORDERING FROM CATALOGS VIA THE INTERNET

FIELD OF THE INVENTION

The present invention relates to a method and system for browsing and ordering from catalogs via the Internet.

BACKGROUND OF THE INVENTION

Historically, people have shopped from the comfort of their homes (or offices) using printed paper catalogs. The traditional printed catalog typically is a multi-page book containing an array of product pictures and descriptions and detailed information for purchasing such products.

A typical printed catalog page may include a title, which is the category of products presented on the page, and one or more presentations for products appearing within the category name. Typically, each presentation includes a picture of the product, a headline defining the benefits of the product, copy beneath the headline describing various features of the product, including, for example, size, color and weight, and detailed information and pricing for ordering the product from the catalog company.

Also included in a typical printed catalog is an order form for purchasing selected products using the ordering information. The ordering information for desired products is placed on the order form, which is then mailed to the catalog company. Alternatively, a purchaser can call what is typically a toll-free number to speak to a catalog company representative who takes the information for processing product purchases.

More recently, the Internet has become a vehicle for electronic commerce and a viable alternative for in home (or office) purchases of products from companies that maintain a web site from which product information may be obtained and products ordered.

The Internet is a global communications system in which a vast number of computers and other devices are networked to allow user-to-user communications and transfers of data files from one machine to any other on the network. The World Wide Web serves as one type of interface to the Internet that allows users to readily navigate the Internet's vast resources. The Web allows information and data dispersed across the Internet to be linked in an easily accessible way. This information or data typically includes text, graphics, illustrations, sound and video.

The World Wide Web uses a client/server architecture in which client programs, called web browsers, running on users' computers request data from server programs running on other computers known as servers, which are located elsewhere on the Internet. The data requested by a user's browser is typically part of a web site maintained by a company or other entity. When the browser program requests the data, a web server hosting the web site sends the requested data back over the Internet to the browser, which then interprets and displays the data on the user's computer screen. Thus, a web browser is a computer program or application that has the ability to request data from any server on the Internet and interpret and display on a user's computer the data sent by a server through the Internet. Conversely, a web server is a computer program that responds to web browser requests for data and sends the requested data to the web browser through the Internet.

A web page is typically a file that contains HTML (hypertext mark-up language) files containing text and graphics, along with a set of HTML tags that describe how the text and graphics should be formatted and displayed on a user's computer screen. The tags are instructions that tell the web browser how the page should look when it displays the page on a user's computer. So, for example, the tags serve to change the font size or color, arrange things in columns, etc. The graphics or images on web pages are typically either GIF files or JPG files. The GIF files are generally used for drawn graphics, while the JPG files are generally used for photographs or scanned images.

The World Wide Web uses an addressing system known as a Uniform Resource Locator (URL). A URL consists of four parts that, when combined, completely define the location of any file or service located anywhere on the Internet. These parts are the protocol, domain name, path, and filename. Thus, a user's browser, in requesting a web page from a web site, sends a message over the Internet that includes at least a transfer protocol (e.g., http://), and a domain name (e.g., www.catalogcompanyname.com). The last two components of a URL may or may not exist, depending on the location and type of information any given hyperlink points to. The server receives the user's request and retrieves the requested web page or other file, which is composed in HTML. The server then transmits the requested page or other file back across the Internet to the user's computer. The user's browser program receives the HTML file and displays its interpretation of the requested file. Thus, browser programs send requests and receive the data needed to display the HTML page on a user's screen. This includes the HTML file itself, plus each of the graphic, sound and video files mentioned in the HTML file. Once the data is retrieved, the browser formats the data as indicated by the HTML tags and displays it on the user's computer screen.

Web pages are typically hypertext documents, i.e., documents which provide clearly visible links to other documents or web pages on the World Wide Web. When a user clicks on a hypertext link, or hyperlink, a new request to retrieve another file is sent over the Internet. With a web browser, a user typically sees formatted documents that contain text, graphics and highlighted hyperlinks. The browsers let a user navigate the Internet, not by entering commands, but rather by moving a mouse pointer to a desired hyperlink and clicking. The browser establishes contact with the related server in a remote computer, and the server transfers the requested file to the user's machine, displaying it in the user's browser as another formatted, hyperlink document. Thus, a user can "surf" the web by hopping from hyperlink to hyperlink without delving deeply into the contents of any particular document.

Users connect to the Internet typically via a modem dial-up connection to an Internet Service Provider, although some connect via a direct line such as a T1 or a T3 line. Most modem dial-up connections occur over regular phone lines. These analog lines have limited bandwidth, which limits the rate of speed at which data can be transferred from the Internet to a user's computer. Common transfer rates for modems used with analog phone lines are 28.8 and 56 Kbps. With a rate of data transfer of 28.8 Kbps, the download of a typical window screen consisting of 50 KBytes of data can take as much as 13 seconds, while a 1 MegaByte image file at the same data transfer speed could take as much as 5 minutes. Thus, where you have a user who is looking to download catalog web pages containing multiple graphical images per page, a significant amount of time can be spent by the user waiting for the download of each page.

It is possible to reduce download time by subscribing to an improved connection service, such as ISDN (Integrated Services Digital Network) or DSL (Digital Subscriber Line).

While such services allow for faster download times, they are not available in many locations, such as the rural locations where persons who traditionally use catalogs to shop live. Moreover, there is an additional expense to a user of these services, which may not be affordable or justified, given the purpose for which a user's computer and Internet connection may be used. This may be particularly the case where a user operates his or her computer and Internet connection for personal purposes only.

SUMMARY OF THE INVENTION

The present invention is a method and system for browsing and ordering from catalogs via the Internet which overcomes the download limitations associated with performing these tasks using a typical modem dial-up connection to the Internet. According to the present invention, an Internet user/catalog customer seeking to browse a catalog, is first provided with a low resolution image file of a requested catalog page that provides the customer with a collection of low resolution images for identifying the products presented on the catalog page. Nominally, this low resolution file would be 20-30 K bytes in size, it having been generated using a reduction computation based on a reduction ratio of nominally 2 MB to 20 KB. Each time the customer requests a new catalog page, a low resolution image of the requested page is displayed on the customer's computer by the customer's browser program. The size of the computer file corresponding to each of the low resolution image pages is reduced to be as small as possible, while still allowing sufficient detail to allow a customer to recognize generally the category name, headline and the products imaged on the page. By initially providing such low resolution images of the requested catalog pages, the pages can be quickly downloaded to a customer's computer, thereby allowing the customer to quickly browse selected catalog "pages." While product catalogs are typically directed to physical items offered for sale by a catalog company, the present invention also contemplates a broader definition of "products" that may include, for example, services or non-tangible items that may be offered by a company as its products.

When a customer sees a product in which he or she is interested, the customer can request more detailed information about the particular product by clicking on a hyperlink that connects the customer to another file containing such detailed information. The hyperlink, which is embedded in the low resolution image catalog page, may be a blocked area which, in effect, corresponds to the entire presentation of the product pictured on the page. When a customer clicks anywhere in this "live" blocked area corresponding to a particular product, a more detailed presentation for that product is provided. This more detailed presentation may be built from several files which include a higher resolution image (i.e., larger file size) of the product, a headline file identifying the product, a copy file describing the product, and an order block data file providing detailed information for ordering the product. The more detailed presentation is then transmitted by the catalog web page server to the customer over the Internet, after which the customer's browser receives the detailed presentation file and displays it in the customer's computer according to the format contained in the more detailed file. If the customer decides to buy the product, another hyperlink in the detailed presentation is then clicked to obtain another file in which information for ordering the product is stored. If the customer chooses to not buy the product, then he or she has the option of returning to the low resolution image catalog page previously being viewed, after which the detailed presentation for another product pictured on that low resolution image catalog page can be requested by clicking on the blocked area link for that product. Alternatively, the customer can request a different catalog page, whereupon a low resolution image of the requested page is then transmitted by the catalog web page server to the customer's browser program for viewing by the customer.

BRIEF DESCRIPTION OF THE DRAWINGS

FIG. 3 is a sample of a web page for a product catalog company;

FIG. 6 is a detailed presentation of a selected one of the products shown on the low resolution image catalog page of FIG. 5;

FIG. 7 is a second detailed presentation of another product shown on the low resolution image of the catalog page of FIG. 5;

FIG. 8 is a low resolution image of a "specials" page of the web page catalog also accessed through a link on the web page of FIG. 3; and FIG. 9 is a detailed presentation of one of the products shown on the low resolution image "specials" page of FIG. 8.

DESCRIPTION OF THE PREFERRED EMBODIMENT

Figure 1:
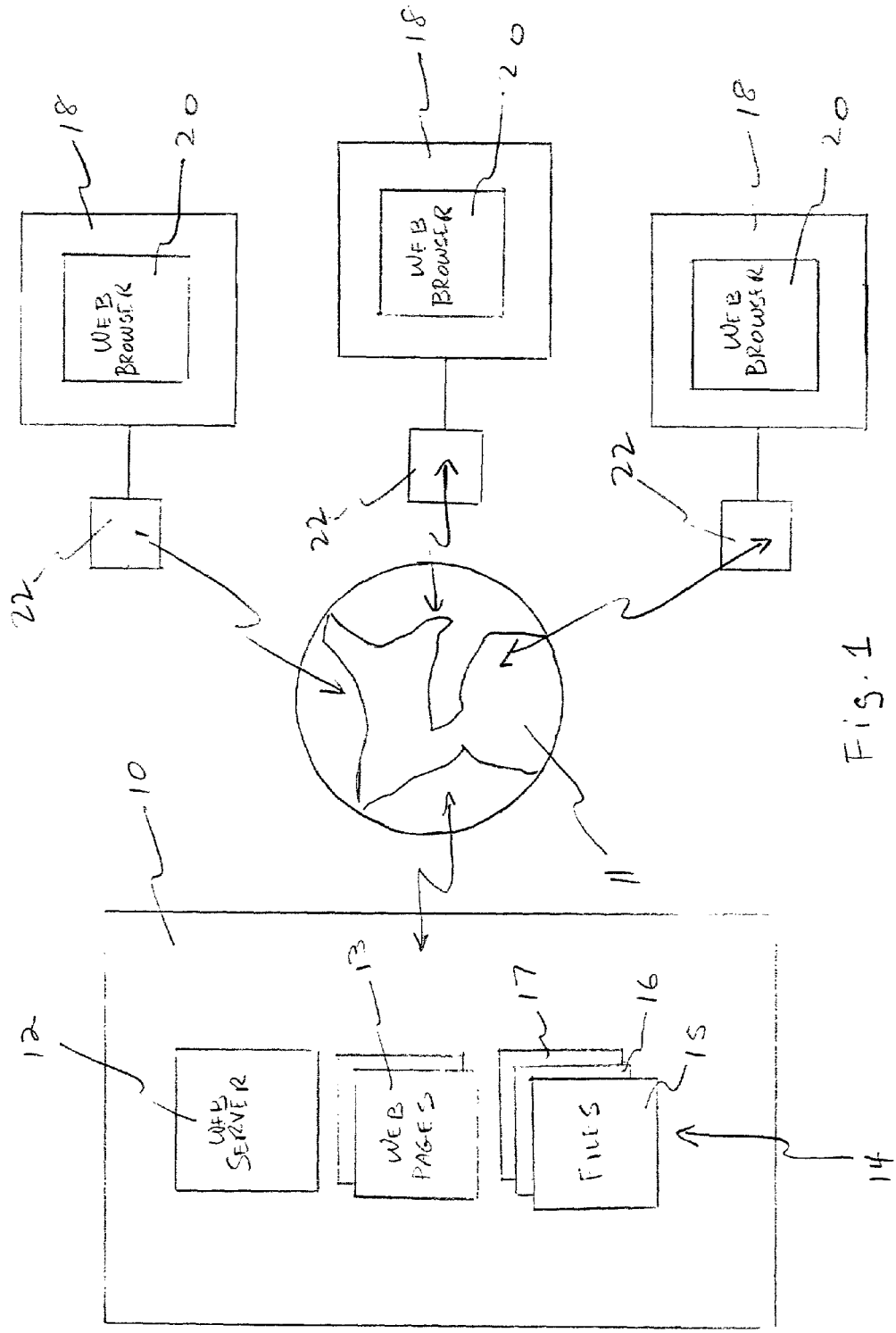
FIG. 1 is a block diagram of a system for carrying out the catalog browsing and ordering method of the present invention.

FIG. 1 is a block diagram illustrating a system for carrying out the catalog browsing and ordering method of the present invention. Shown in FIG. 1 is a server computer system 10 connected to the Internet 11. Stored in the memory (not shown) of computer 10 is a web server program 12 and a plurality of files 14 relating to a product catalog web page 13. Constituting the plurality of files 14 are a first series of files 15, which are low resolution images of the catalog pages comprising the product catalog, a second, larger series of files 16 which are detailed presentations of the products shown on the low resolution image catalog pages 15, and a third series of files 17 displayed to customers as "access pages" to implement the displaying of catalog pages and the ordering of products pictured on such pages.

Also shown in FIG. 1 are several client systems 18, each of which can be, for example, a television with Internet access, but which is preferably a personal computer with a modem 22 for connecting to the Internet 11. Stored in each computer 18's memory (not shown) is a browser program 20 for requesting information from web servers, such as server 12. The client systems 18 are each typically operated by a customer desiring to browse, and perhaps order products from, a catalog web page.

Although not specifically shown in FIG. 1, computers 10 and 18 would typically include central processing units (CPUs) and system buses that would couple various computer components to the CPUs. These system buses may be any of several types of bus structures, including a memory bus or memory controller, a peripheral bus, and a local bus using any of a variety of bus architectures. The memory used by computers 10 and 18 would also typically include random access memory (RAM) and one or more hard disk drives that read from, and write to, (typically fixed) magnetic hard disks. A basic input/output system (BIOS), containing the basic routines that help to transfer information between elements within a personal computer system, such as during start-up, may also be stored in read only memory (ROM). Computers 10 and 18 might also include other types of drives for accessing other computer-readable media, such as a removable "floppy" disks, or an optical disk, such as a CD ROM. The hard disk, floppy disk, and optical disk drives are typically connected to a system bus by a hard disk drive interface, a floppy disk drive interface, and an optical drive interface, respectively. The drives and their associated computer-readable media provide nonvolatile storage of computer-readable instructions, data structures, program modules, and other data used by machines, such as computers 10 and 18. Computer 10 will also include a communications device (not shown) for connecting to Internet 11. Such communications device and modems 22 may be internal or external, and are typically connected to the computer's system bus via a serial port interface. Computers 10 and 18 may also include other typical peripheral devices, such as printers, displays and keyboards. Typically, computer 18 would include a display monitor (not shown) on which various catalog pages and other catalog information are displayed.

Figure 2:
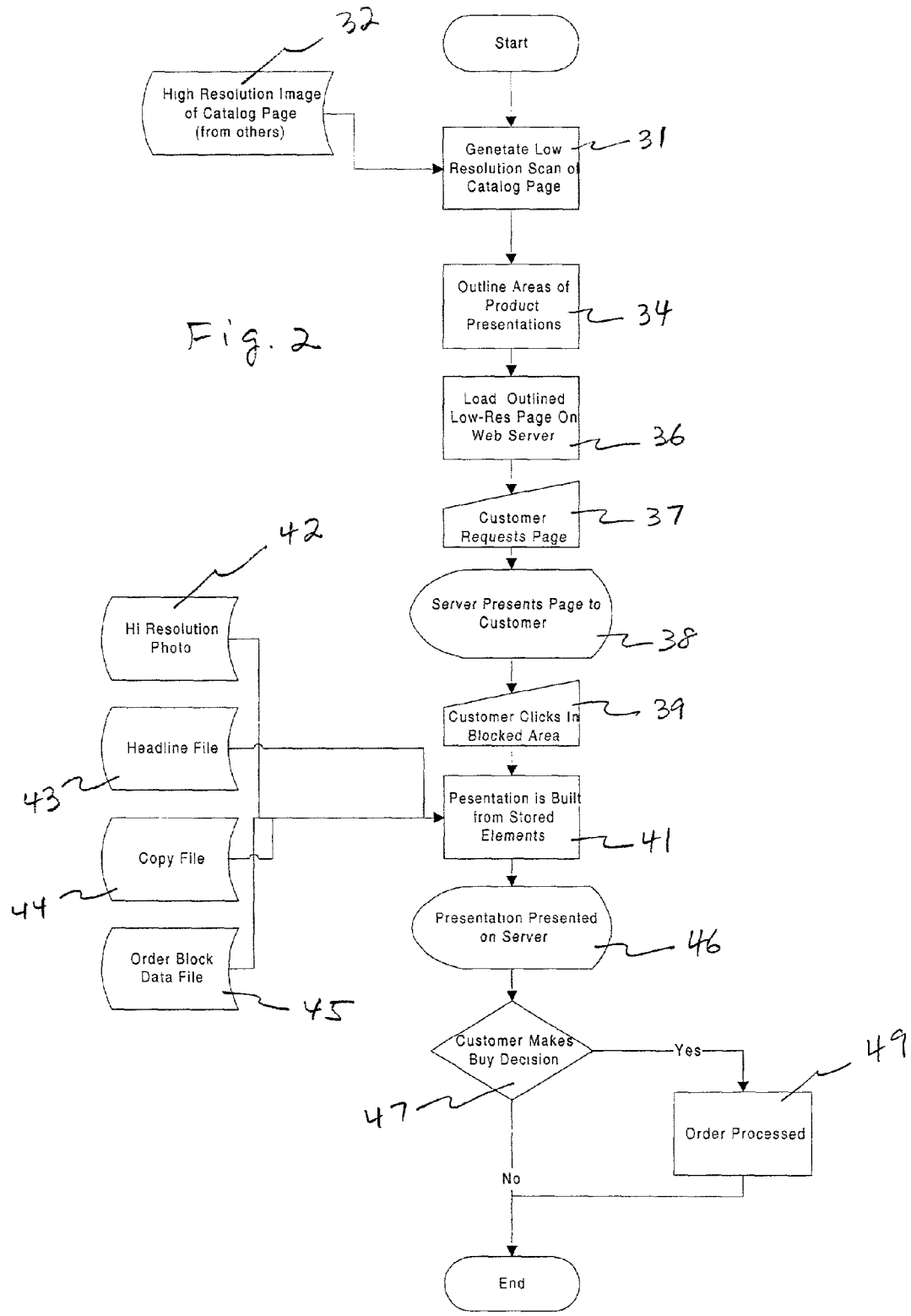
FIG. 2 is a flow diagram of the catalog browsing and ordering method of the present invention.
Figure 5:
FIG. 5 is a sample of a low resolution image catalog page requested using the requesting page of FIG. 4.

FIG. 2 is a flow diagram for the catalog browsing and ordering method of the present invention. The first step 31 is generating the computer files 15 containing for each catalog page a low resolution scan image from a corresponding detailed catalog page 32. In the present invention, each such low resolution image catalog page is a computer file nominally 20-30K bytes in size. An example of such a low resolution image catalog page 33 is shown in FIG. 5 of the application.

The next step 34 in the method of the present invention is to create for each low resolution image catalog page an image map for each product pictured in the low resolution image catalog page. These image maps use an X-Y coordinate system to define the outline of areas corresponding to the product pictures. Clicking with a mouse within an area, such as area 35 shown in FIG. 5, causes server 13 to return a detailed product presentation page hyperlinked to such area.

A low resolution image is generated for each page of the catalog to be accessed at the product catalog web site. Once the low resolution images of the various catalog pages are generated, the next step 36 shown in FIG. 2 is to load the area outlined low resolution pages 15 into Computer 10's memory so that they can be accessed by web server 12.

Figure 4:
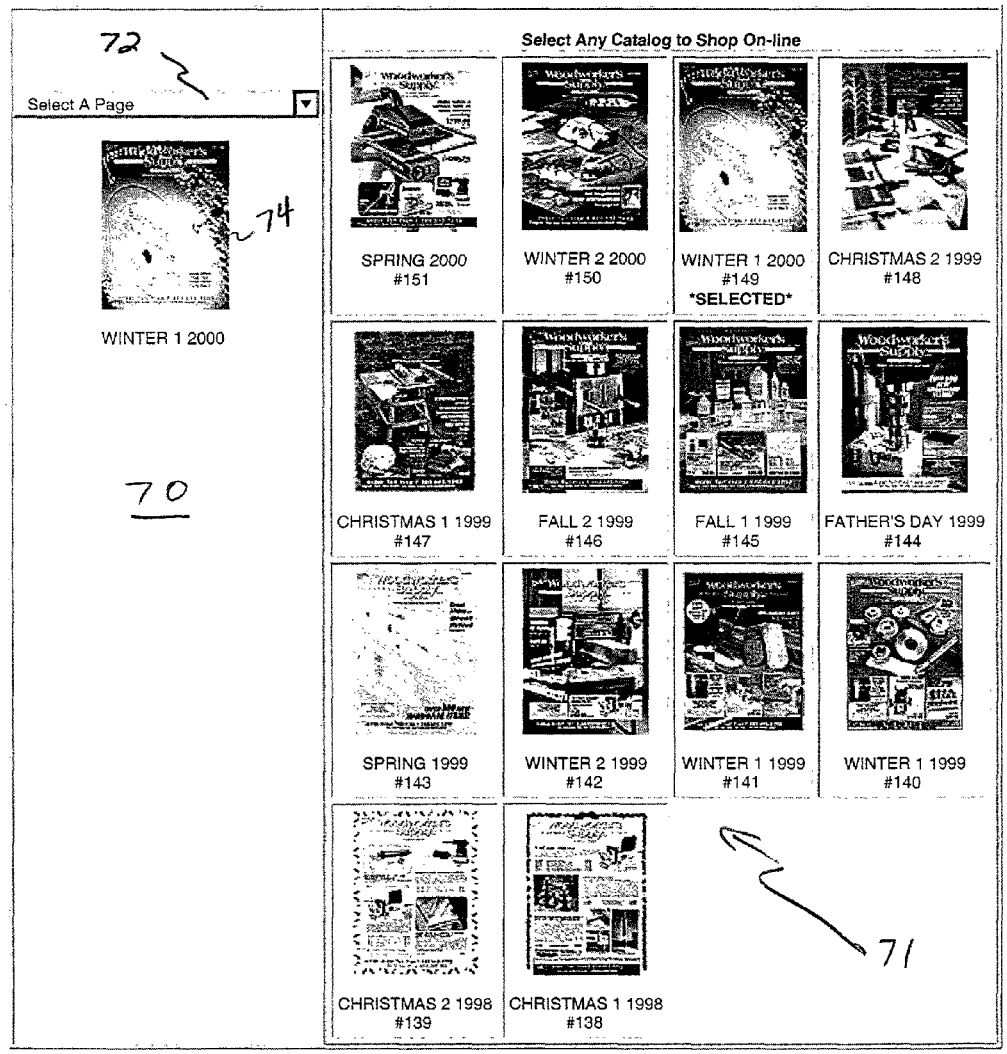
FIG. 4 is another page linked to the web page of FIG. 3 through which a customer requests a desired product catalog and particular pages of the product catalog.

When a customer links to a product catalog web page, such as that shown in FIG. 3, he or she is presented with a display 60, that includes a number of hyperlinks 62 that allow the customer to further link to various files associated with browsing the catalog's pages and with ordering products from the catalog. Clicking on the "browse print catalog" link 64 causes the user to link to a new page 70 shown in FIG. 4 for requesting a particular catalog and then particular pages from the selected catalog. Page 70 shown in FIG. 4 includes a plurality of links 71 for selecting a particular catalog and a page selection field 72 for selecting a desired page number of a selected catalog 74. After the "Select A Page" field 72 is clicked, a drop menu (not shown) appears from which the customer can choose a desired page by a second click on a page number, which links the user to the catalog page corresponding to the page number clicked in field 72 shown in FIG. 4. Clicking on a desired catalog and then on a page number in field 72 corresponds to the step 37 in FIG. 2 of requesting a particular catalog page.

At step 38 of FIG. 2, web server 12 sends to a customer's computer 18 the low resolution image of the requested catalog page, such as catalog page "29" (web page 33) shown in FIG. 5, after which the customer's web browser 20 displays web page 33 on customer's computer 18.

At step 39 of FIG. 2, the customer clicks in an outlined area for a given product, such as, by way of example, area 35 shown in FIG. 5. Clicking on outlined area 35 links the user to another web page 40 shown in FIG. 6 that is a detailed presentation of the product shown in area 35 of FIG. 5. This detailed presentation of such product is dynamically created at step 41 of FIG. 2. The web server 12 presents one of the pages 16 which is a detailed presentation of the product shown in the low resolution image of the web page 33 shown in FIG. 5.

Referring simultaneously to FIGS. 2 and 6, the detailed presentation 40A shown in FIG. 6 typically includes a high resolution photograph 42A, a headline 43A, product copy 44A and an order block 45A for purchasing the product pictured and described in FIG. 6. The high resolution photograph 42A is generated from a JPG file 42 accessed by web server 12. The headline 43A, copy 44A and order block 45A are all dynamically generated from headline file 43, copy file 44 and order block data file 45, respectively, also accessed by web server 12. At step 46 of FIG. 2, the presentation of FIG. 6 is sent through the Internet to browser 20, where it is displayed on the customer's system 18. After the detailed presentation 40A is displayed on the customer system 18, at step 47 of FIG. 2, the customer makes a buy decision as to whether to purchase the product presented on his or her system 18.

If the customer chooses to buy the product, he or she clicks a buy button 48A shown in FIG. 6, whereupon at step 49 of the flowchart of FIG. 2, the order is processed. If the customer chooses to not purchase the product, he or she simply clicks the back button on the web browser to return to the previously displayed low resolution image catalog page.

Referring again to FIG. 5, if a customer decides to purchase a different product 50 shown in the low resolution image catalog page "29" (web page 33), then he or she clicks in the outline area 50 for such product to obtain a detailed product presentation for that particular product. The new detailed presentation 40B shown in FIG. 7 is then accessed when link 50 in low resolution image web page 33 is clicked. Here again, the detailed presentation 40B shown in FIG. 7 includes a high resolution photograph 42B of the product, a headline 43B, product copy 44B and an order data block 45B. As can be seen in FIGS. 5 and 7, one or more products displayed on a catalog page, such as product 50 shown in FIG. 5, can be a plurality of items that have been grouped together for presentation in the catalog, such as the plurality of drill bits shown as product 50 in FIG. 5 and described in more detail in FIG. 7. In such a case, the high resolution photograph 42B of the product, headline 43B, product copy 44B and order data block 45B would typically describe or reflect a plurality of items. Thus, for example, the order data block 45B for the plurality of drill bits shown in high resolution photograph 42B and described in headline 43B and product copy 44B of FIG. 7 lists a plurality of bits and prices for such bits. If the customer wishes to order one or more of the items comprising the product shown in FIG. 7, he or she again clicks the corresponding buy button(s) 48B to initiate the purchase.

Also included in the web page 70 (FIG. 4) for selecting particular catalog pages by page number, is a search link 73 which links the user to a field (not shown) in which can be typed a product name or product description keyword for purposes of locating the catalog page, or pages, on which such product is displayed and described. Once the product name or keyword is entered in the field, a "Go" button (not shown) is clicked, which then links the customer to the low resolution image catalog page on which the product is displayed and described. With the right product name or keyword, the customer would again be linked to the web page showing, for example, the low resolution image web page 33 (catalog page 29) of FIG. 5. If the customer then wanted additional information about any of the products shown in catalog page 29, he or she would again click an outline area, such as, for example, areas 35 or 50, to retrieve one or the other of the detailed product presentation 40A or 40B shown in FIGS. 6 and 7, respectively.

Referring again to the web page 60 shown in FIG. 3, other hyperlinks can be included on page 60 to initiate other browsing and/or buying functions. For example, web page 60 can include a "specials" link 66 which, when clicked, links the customer to yet another web page 80 containing a low resolution image of a catalog page containing various products on special sale. An example of a "specials" catalog page is shown in FIG. 8 of the application. In the example shown in FIG. 8, the specials page 80 includes several product pictures 82 and a corresponding number of headlines 84 identifying the products pictured on page 80. In this case, also included are subheadlines 86 which identify the date until which each of the products is on sale. If a customer wishes to obtain further information about a particular special product, he or she clicks on an outline area 88 or a word link 89 corresponding to the desired product. Clicking on outline area 88 or word link 89 links the customer to a detailed presentation web page 90 for the product depicted in the outline area 88. The detailed presentation web page 90 is shown in FIG. 9. Here again, the detailed presentation 90 includes a high resolution photograph 42C, a headline 43C, product copy 44C and an order block 45C, which in this case includes two entries. If a customer decides to order one or more of the specials products, he or she clicks one or more buy buttons 46C corresponding to such products.

Referring again to the web page shown in FIG. 3, other hyperlinks that can be included on the web page 60 are pictures 68 depicting different types of products. The picture links allow a user to go to different types of products in which he or she may be interested. Web page 60 can also include a "checkout" hyperlink 67 which initiates a final purchase of the selected products.

Although the present invention has been described in terms of a particular embodiment, it is not intended that the invention be limited to that embodiment. Modifications of the disclosed embodiment within the spirit of the invention will be apparent to those skilled in the art. For example, the web page can include additional hyperlinks to initiate additional functions associated with the browsing of the product catalog and the purchasing of products within the catalog. It can also include other hyperlinks for other functions such as new products, upcoming events, news, customer rights, security and privacy, forms, gift registries, and the establishment of a personal catalog which includes products previously purchased by a customer or products in which the customer has an interest but which he or she may not have yet purchased. The scope of the present invention is defined by the claims that follow.

What is claimed is:

1. A method of browsing a product catalog via a telecommunications network comprising:

for each page of said product catalog, storing in a first device connected to said network a low resolution image file of a predefined size for providing a separate low resolution image of said catalog page, each of said catalog pages containing at least one product image and text for identifying and purchasing products presented on said catalog page, said low resolution catalog page image displaying said product image and text in the format of a printed catalog page, transmitting from a second device connected to said network at least one request for at least one page of said product catalog, transmitting from said first device in response to said at least one page request said low resolution image file of said requested catalog page, for each product displayed on said low resolution image of said requested catalog page, storing in said first device a plurality of files from which a separate detailed presentation of said product is prepared, transmitting from said second device at least one second request for one of said detailed product presentations, and transmitting from said first device in response to said at least one second request a detailed product presentation file for displaying said detailed product presentation, said presentation comprising at least a high resolution photograph of said product and an order data block containing at least one entry of ordering information for said product and a corresponding link for each ordering information entry for directly purchasing said product, wherein the step of preparing the detailed product presentation file comprises obtaining information from:

a file containing said high resolution image of said product, a headline file identifying said product, a copy file containing a description of said product, and an order block data file containing said ordering information for purchasing said product.

2. The method of claim 1 wherein the step of transmitting said detailed product presentation file comprises transmitting information from:

said file containing said high resolution image of said product, said fourth file containing said headline file identifying said product, said copy file containing said description of said product, and said order block data file containing said ordering information for purchasing said product.

3. A method of browsing a product catalog via the Internet comprising:

storing in a first device connected to the Internet a file corresponding to a web page for said product catalog, for each page of said product catalog, storing in said first device a corresponding low resolution image file of a predefined size for providing a separate low resolution image of said catalog page, each of said catalog pages containing at least one product image and text for identifying and purchasing products presented on said catalog page, said low resolution catalog page image displaying said product image and text in the format of a printed catalog page, for each product displayed on each said low resolution image of each said catalog page, storing in said first device a plurality of files from which a separate detailed presentation of said product is dynamically prepared, transmitting from a second device connected to the Internet a first uniform resource locator for said product catalog web page, transmitting from said first device in response to said transmission of said first uniform resource locator said product catalog web page, transmitting from said second device a second uniform resource locator corresponding to a file for selecting pages of said product catalog, transmitting from said first device in response to said transmission of said second uniform resource locator said file for selecting pages of said product catalog, transmitting from said second device a first at least one request for at least one page of said product catalog, transmitting from said first device in response to said request for said at least one page said low resolution image file of said requested catalog page, transmitting from said second device a second at least one request for one of said detailed product presentations corresponding to at least one product displayed on said low resolution image of said catalog page, and transmitting from said first device in response to said at least one request a detailed product presentation file for displaying said detailed product presentation, said presentation comprising at least a high resolution photograph of said product and an order data block containing at least one entry of ordering information and a corresponding link for directly purchasing said product, wherein the step of preparing said corresponding detailed product presentation file comprises obtaining information from:

a file containing said high resolution image of said product,
a headline file identifying said product,
a copy file containing a description of said product, and
an order block data file containing said ordering information for purchasing said product.

4. The method of claim 3 wherein the step of transmitting said corresponding detailed product presentation file comprises transmitting information from:

said file containing said high resolution image of said product,
said headline file identifying said product,
said copy file containing said description of said product, and
said order block data file containing said ordering information for purchasing said product.

5. A system for browsing a product catalog via a telecommunications network comprising:

a storage device in a first device connected to said network, said storage device configured to store a low resolution image file of a predefined size for providing a separate low resolution image for each page of said product catalog, each of said catalog pages containing at least one product image and text for identifying and purchasing products presented on said catalog page, said low resolution catalog page image displaying said product image and text in the format of a printed catalog page, a second transmission device connected to a second device connected to said network, said second transmission device configured to transmit at least one request for at least one page of said product catalog, a first transmission device connected to said first device, said first transmission device configured to transmit in response to said at least one page request said low resolution image file for said requested catalog page, wherein the storage device is configured to store a plurality of files from which is prepared a separate detailed presentation of each product displayed on said low resolution image of said requested catalog page, the second transmission device is configured to transmit from said second device at least one second request for one of said detailed product presentations, and the first transmission device configured to transmit from said first device in response to said at least one second request a detailed product presentation file for displaying said detailed product presentation, said presentation comprising at least a high resolution photograph of said product and an order data block containing at least one entry of ordering information for said product and a corresponding link for directly purchasing said product, wherein said detailed product presentation file is comprised of information from:

a file containing said high resolution image of said product,
a headline file identifying said product,
a copy file containing a description of said product, and
an order block data file containing said ordering information for purchasing said product.

6. A system for browsing a product catalog via a telecommunications network comprising:

a storage device in a first device connected to said network, said storage device configured to store a low resolution image file of a predefined size for providing a separate low resolution image for each page of said product catalog, each of said catalog pages containing at least one product image and text for identifying and purchasing products presented on said catalog page, said low resolution catalog page image displaying said product image and text in the format of a printed catalog page, a second transmission device associated with a second device connected to said network, wherein said second transmission device is configured to transmit at least one request for at least one page of said product catalog, a first transmission device associated with said first device, wherein said first transmission device is configured to transmit in response to said at least one page request said low resolution image file for said requested catalog page, the storage device in said first device configured to store a plurality of files from which is prepared a separate detailed presentation of each product displayed on said low resolution image of said requested catalog page, the second transmission device configured to transmit from said second device at least one second request for one of said detailed product presentations, wherein said transmission includes at least one request for at least one page of said product catalog further comprises means for requesting a specials page describing products which are on sale, and the first transmission device configured to transmit from said first device in response to said at least one second request a detailed product presentation file for displaying said detailed product presentation, said presentation comprising at least a high resolution photograph of said product and an order data block containing at least one entry of ordering information for said product and a corresponding link for directly purchasing said product.

* * * * *